United States Patent [19]

Yamashita et al.

[11] Patent Number: 4,625,562
[45] Date of Patent: Dec. 2, 1986

[54] AMORPHOUS MAGNETIC ALLOY SENSOR

[75] Inventors: Ichiro Yamashita, Yawata; Hiroyuki Hase, Katano; Yukihiko Ise, Toyonaka, all of Japan

[73] Assignee: Matsushita Electric Industrial Co., Ltd., Osaka, Japan

[21] Appl. No.: 667,224

[22] Filed: Nov. 1, 1984

[30] Foreign Application Priority Data

Jun. 8, 1984 [JP] Japan .................................. 59-118508
Jul. 18, 1984 [JP] Japan .................................. 59-148802

[51] Int. Cl.$^4$ ............................................. G01L 9/16
[52] U.S. Cl. .................................. 73/728; 73/DIG. 2; 336/20; 336/30
[58] Field of Search .................. 73/728, 722, DIG. 2, 73/862.69, 779; 336/20, 30, 135; 324/209

[56] References Cited

U.S. PATENT DOCUMENTS 3,007,063 10/1961 Harris .............................. 73/DIG. 2
4,412,454 11/1983 Yamashita et al. .................. 73/728

Primary Examiner—Donald O. Woodiel
Attorney, Agent, or Firm—Spencer & Frank

[57] ABSTRACT

A stress or strain sensor including a magnetic circuit having at least a part constituted by an amorphous magnetic alloy. For detection of the inductance value of the sensor, a DC magnetic field is superposed on an AC magnetic field so that magnetic domains of the alloy tend to be aligned. The sensor output can be increased significantly over that of the conventional sensor in which only the AC magnetic field is employed, while hysteresis of the output is reduced. The temperature characteristic is also improved.

1 Claim, 9 Drawing Figures

Microfiche Appendix Included
(07181986 Microfiche, Woodiel; Donald O. Pages)

AMORPHOUS MAGNETIC ALLOY SENSOR

The present invention relates to an amorphous magnetic alloy sensor.

Heretofore, a variety of stress and/or strain detecting sensors having been proposed and developed in which magnetostriction of amorphous magnetic alloys is made use of. The operating principle of such sensors resides in that the magnetic characteristic, especially impedance, of a magnetic circuit which includes at least a part constituted by an amorphous magnetic alloy undergoes variation under influence of a quantity to be identified or measured such as stress, strain and others. Accordingly, on the basis of the change in the characteristic or impedance of the magnetic circuit, the magnitude of the physical event or quantity to be measured can be detected. For detecting the change in impedance of the magnetic circuit ascribable to the magnetostriction effect exhibited by the amorphous magnetic alloy under influence of the physical quantity to be measured, an alternating or AC magnetic field is applied to the magnetic circuit. However, the hitherto known sensor suffers from outstanding problems in respect to the sensitivity, reproducibility as well as temperature characteristic and encounters difficulty in practical implementation. Under the circumstances, there exists a great demand for means which can solve the problems of the conventional sensors in which the amorphous magnetic alloy is used.

An object of the present invention is to provide an apparatus for detecting stress and/or strain which apparatus is realized by making use of the magnetostrictive property of an amorphous magnetic alloy and which is improved in respect to the sensitivity, reproducibility and the temperature characteristic.

The present invention will be more apparent from the following detailed description taken in conjunction with the accompanying drawings, in which.

Figure 1:
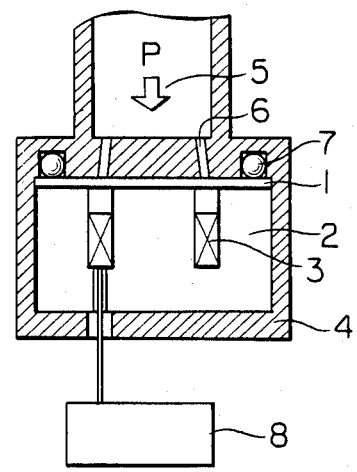
FIG. 1 is a schematic sectional view of a pressure sensor in which an amorphous magnetic alloy is employed.
Figure 3:
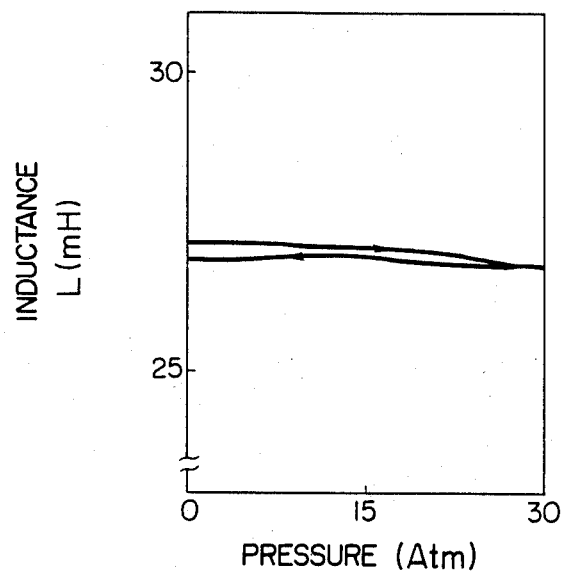
Figure 4:
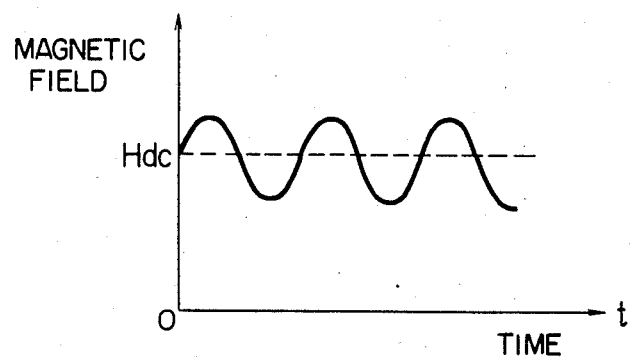
Figure 5:
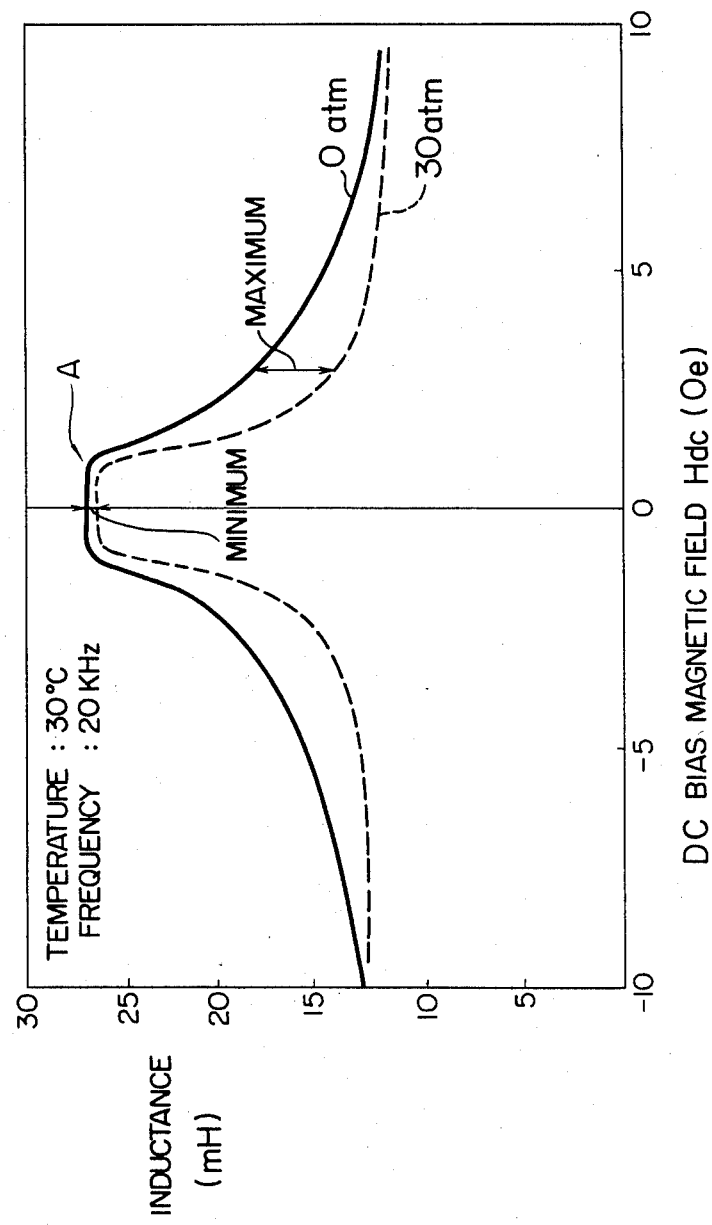
Figure 6:
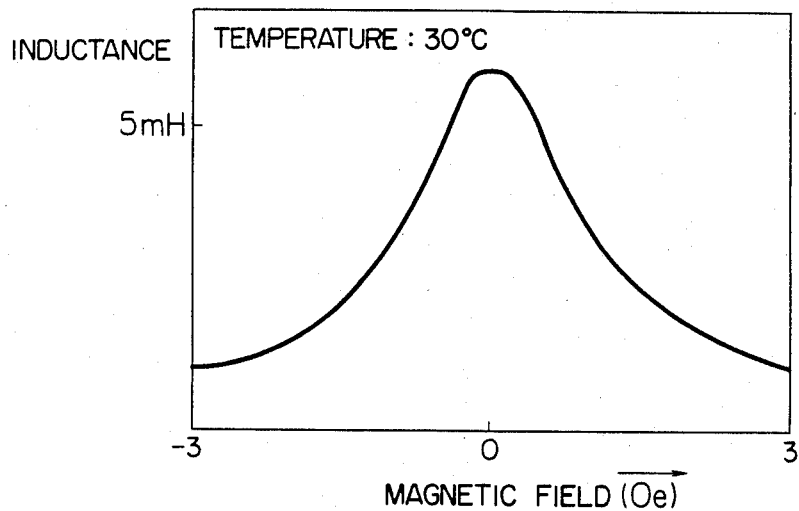
Figure 7:
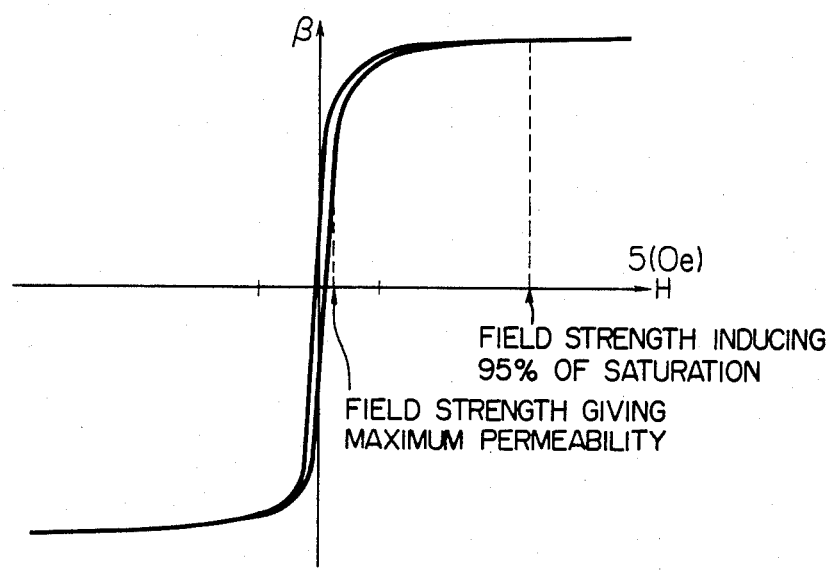
Figure 8:
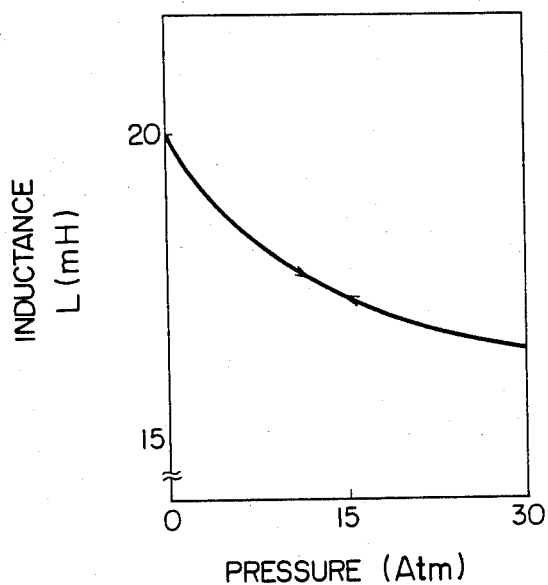
Figure 9:
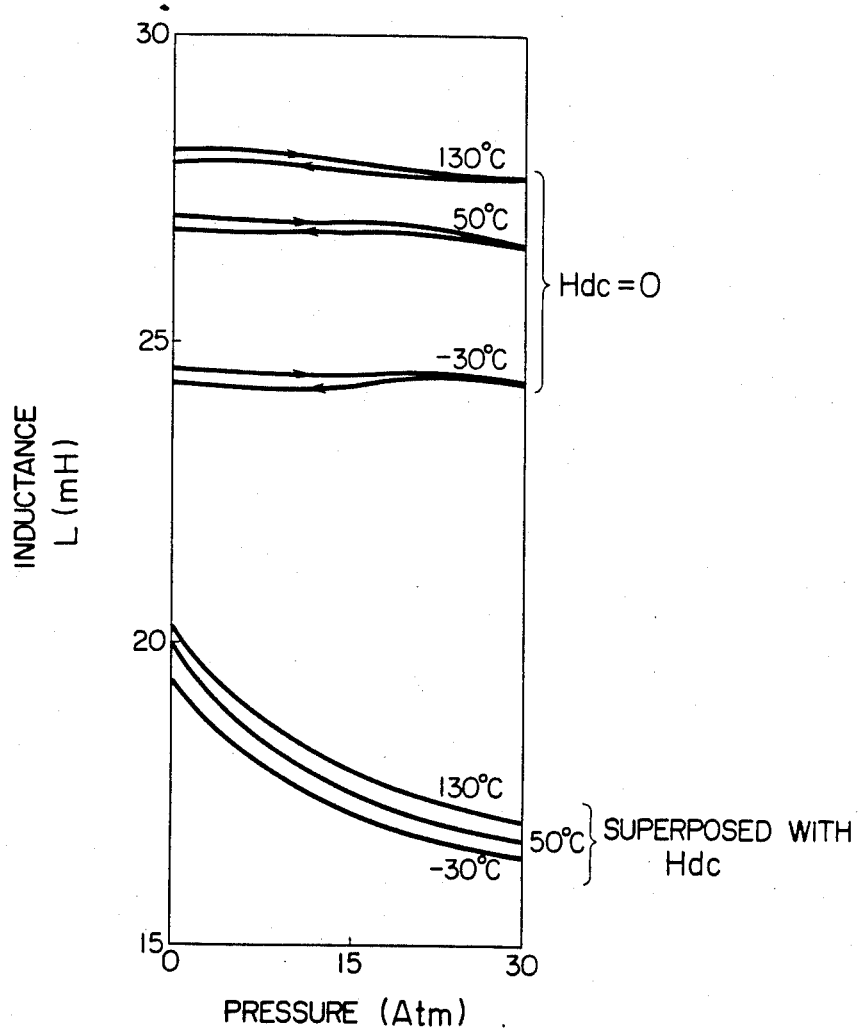

FIG. 3 graphically illustrates the result of a measurement conducted by using a hitherto known amorphous magnetic alloy detector;

FIG. 4 shows the waveform of a detecting magnetic field employed in accordance with the teaching of the invention;

FIG. 5 illustrates the characteristic dependence of the inductance of a pressure sensor on a DC superposed magnetic field under application of pressure in a range of 0 to 30 atm;

FIG. 6 shows the characteristic dependency of the inductance of the pressure sensor shown in FIG. 1 on a DC superposed magnetic field;

FIG. 7 is a view illustrating the B-H loop characteristic of the amorphous magnetic alloy mentioned above;

FIG. 8 graphically illustrates the result of a measurement conducted with the aid of the pressure sensor according to the invention; and FIG. 9 is a view for illustrating comparatively the temperature dependence characteristics of hitherto known detectors and the detector according to the invention.

Now, the invention will be described in conjunction with the preferred embodiments thereof.

Referring to FIG. 1 which shows a pressure sensor realized by making use of the magnetostriction of an amorphous magnetic alloy, the numeral 1 denotes the amorphous magnetic alloy exhibiting the magnetostriction effect which cooperates with a soft magnetic ferrite material 2 to constitute a magnetic circuit which is adapted to be excited by a coil 3, the latter being housed within a case 4. Through-holes 6 are formed in the case 4 and communicated with a guide conduit 5 for applying pressure to the amorphous magnetic alloy 1. A reference numeral 7 denotes an O-ring seal. When distortion or strain is produced in the amorphous magnetic alloy 1 upon application of pressure, the magnetic property of the amorphous magnetic alloy undergoes variation due to the magnetostrictive effect, brining about a corresponding change or variation in the inductance value which is measured by means of an inductance measuring circuit 8. In this manner, the pressure can be measured in terms of the inductance value.

Figure 2:
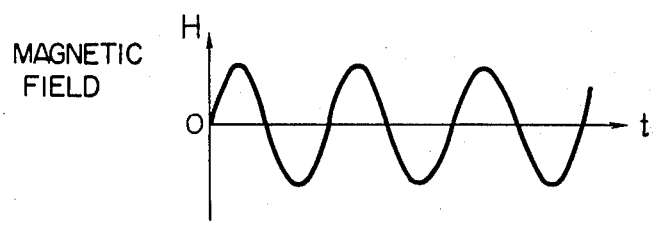
FIG. 2 shows the waveform of the magnetic field used in the hitherto known amorphous magnetic alloy detector.

It has however been found that when an AC magnetic field, as shown in FIG. 2 is employed as is usual in the case of the prior art pressure sensor of this type, the magnitude of the output signal of the sensor has a small value. Besides, the pressure sensor suffers poor reproducibility, a degraded temperature characteristic and an undesirably significant hysteresis phenomenon. FIG. 3 illustrates graphically the variation in inductance in dependence on the pressure as actually measured with application only of an AC magnetic field. The arrows shown in the figure indicates the sequence in which the measurement has been conducted. It will be seen that variation in the inductance value as a function of the pressure exhibits hysteresis.

FIG. 4 shows the waveform of a magnetic field which is to be employed in the inductance detecting apparatus or sensor according to the invention. It will be noted that a DC magnetic field is superposed on the AC magnetic field which is conventionally employed. FIG. 5 graphically illustrates how the inductance value of the pressure sensor shown in FIG. 1 varies in dependence on the magnitude of the superposed DC magnetic field component over a pressure range of 0 to 30 atm at a temperature of 30° C. with the frequency of the AC magnetic field component being 20 kHz. When compared with the results shown in FIG. 5, it will be readily understood that the variation in the inductance value measured in the pressure range of 0 to 30 atm under application of only an AC magnetic field according to the conventional method is very small. In other words, the output signal representative of the inductance value does not vary to any significant extent when only the AC magnetic field is employed, as is shown in FIG. 3. Further, it will be seen in FIG. 5 that the difference in the inductance value between the pressures of 0 and 30 atm. i.e. the magnitude of the sensor output signal starts to increase from a point at which the inductance value begins to decrease as the superposed DC magnetic field increases and attains once a maximum value before decreasing again.

In the pressure sensor used in the measurement, the magnetic reluctance of the soft magnetic ferrite 2 which constitutes a part of the magnetic circuit is significantly low as compared with that of the amorphous magnetic alloy 1 and thus exhibits less magnetostriction effect. Accordingly, the characteristic illustrated in FIG. 5 is by and large due to the amorphous magnetic alloy alone. It is thus established that superposition of a DC magnetic field at the region of the amorphous magnetic alloy 1 for detecting the inductance value contributes to the increased output of the pressure sensor.

FIG. 6 shows graphically an inductance-versus-magnetic field characteristic of the sensor shown is FIG. 1 which has been obtained when the superposed DC magnetic field is applied to the amorphous magnetic alloy alone upon measurement of inductance, while FIG. 7 shows a B-H loop of the alloy. As will be seen in FIG. 6, it is believed that the sensor output can be increased by applying to the amorphous magnetic alloy a superposed DC magnetic field of the strength in a range of about 200 m (Oe) to about 3 (Oe) within which the inductance value undergoes variation. This range of the magnetic field is considered to be smaller than the strength of the magnetic field which induces 95% of the saturated magnetization and greater than the strength assuring the maximum permeability, when observed in consideration of the B-H loop illustrated in FIG. 7. The reason why the magnitude of the DC magnetic field is selected greater than the field strength which gives rise to the maximum permeability can be explained by the fact that the maximum permeability is attained at the time when the movement of domain walls and revolution of magnetization start to take place simultaneously in the course of magnetization. Accordingly, in order to make use of the revolving magnetization, it is required that the strength of the magnetic field be selected greater than the DC magnetic field which gives the maximum permeability. Further, the reason why the magnitude of the DC magnetic field is selected smaller than the field strength which induces 95% of saturated magnetization is explained by the fact that the inductances corresponding to the pressures of 0 to 30 atm, respectively, assume substantially the same value when the magnitude of the DC magnetic field is greater than about 20 (Oe), resulting in disappearance of the sensor output signal, as shown in FIG. 5.

In this connection, it will be noted from the characteristic illustrated in FIG. 5 that the range of the magnetic field which assures that the maximum permeability lies between a range in which the inductance value remains constant in correspondence to a low level of the DC magnetic field and a shoulder portion A at which the inductance value begins to decrease. It has further been found that the superposed DC magnetic field should preferably be of a magnitude corresponding to the shoulder portion A of the B-H loop shown in FIG. 7 in order to realize a more desirable characteristic.

FIG. 8 shows graphically the result of the inductance-versus-pressure relationship measured by the detecting apparatus according to the invention. When compared with FIG. 3, it will be seen that the inductance varies significantly in dependence on variations in the pressure and that no hysteresis phenomenon is observed.

FIG. 9 shows variations in the inductance value at the temperatures of $-30°$ C., $50°$ C. and $130°$ C. as measured by the conventional method in which only the AC magnetic field is employed (i.e. $H_{dc}=0$) on one hand and by a detection apparatus according to the invention in which the superposed DC magnetic field is employed. It will be understood that the temperature dependency of the inductance variation is significantly improved over the prior art according to the teaching of the invention.

The foregoing description has been made in connection with the pressure sensor of the structure shown in FIG. 1. However, it has also been found that the invention can be equally applied to any kinematic quantity/inductance transducer type sensor in which the amorphous magnetic alloy is employed. It is believed that the advantageous affects attained according to the invention can be explained by the fact that magnetic domains in the amorphous magnetic alloy tends to be aligned in the direction of the applied DC magnetic field.

As will be appreciated from the foregoing description, the kinematic/inductance transducer type sensor or detector in which magnetostriction effect of an amorphous magnetic alloy is made use of is significantly improved in respect to the output signal, reproducibility and the stability according to the teachings of the invention.

We claim:

1. An amorphous magnetic alloy sensor device comprising:
   a magnetic circuit including an amorphous magnetic alloy exhibiting magnetostriction, a strain being produced in said amorphous magnetic alloy when pressure is applied thereto; and,
   a coil for applying a magnetic field to said magnetic circuit, said magnetic field having an alternating magnetic field component on which is superimposed a direct current magnetic field component, the intensity of the magnetic field being greater than the field strength which results in maximum permeability of said amorphous magnetic alloy and less than the intensity inducing 95% of the saturation magnetization thereof, whereby a change in the inductance of said magnetic circuit corresponds to a change in the pressure applied to said amorphous magnetic alloy.

* * * * *